United States Patent [19]
Chen

[11] Patent Number: 5,741,055
[45] Date of Patent: Apr. 21, 1998

[54] DRAWER FOR A HARD DISK DRIVE

[76] Inventor: Teng-Chun Chen, No. 1-1, Lane 269, Fu-Teh 1st Rd., Hsi-Chih, Taipei Hsien, Taiwan

[21] Appl. No.: 730,194

[22] Filed: Oct. 15, 1996

[51] Int. Cl.⁶ .............................. G06F 1/16; A47B 95/02; H05K 7/14
[52] U.S. Cl. ...................... 312/348.6; 361/685; 361/725; 16/115
[58] Field of Search .................. 16/115; 312/330.1, 312/348.6, 244, 319.1; 364/708.1; 361/685, 725–727

[56] References Cited

U.S. PATENT DOCUMENTS

| | | | |
|---|---|---|---|
| 5,530,990 | 7/1996 | Chen | 16/115 |
| 5,563,767 | 10/1996 | Chen | 361/685 |
| 5,613,273 | 3/1997 | Tsai | 16/115 |

*Primary Examiner*—Michael W. Phillips
*Attorney, Agent, or Firm*—Pro-Techtor International

[57] ABSTRACT

A hard disk converting drawer structure including a drawer and a fixing seat. A pull handle is back and forth slidably disposed at the front end of bottom side of the drawer. A transverse beam is disposed between two balance levers of the pull handle for back and forth pulling an auxiliary lever to press and close/open a touch switch. When the touch switch is pressed and closed, the auxiliary lever is forced by a leaf spring disposed on one side to retract the pull handle to a hidden position. When the touch switch is bounded open, the pull handle is pushed and ejected for a user to easily pull out the pull handle. When pulling the pull handle, the auxiliary lever is driven to push a stopper block projecting from one side of the fixing seat so as to smoothly draw out the drawer from the fixing seat for taking out the hard disk.

4 Claims, 13 Drawing Sheets

DRAWER FOR A HARD DISK DRIVE

BACKGROUND OF THE INVENTION

The present invention relates to a hard disk converting drawer structure in which the drawer receiving the hard disk can be smoothly drawn out. The pull handle of the drawer is hidden and can be easily pulled out.

Figure 9:
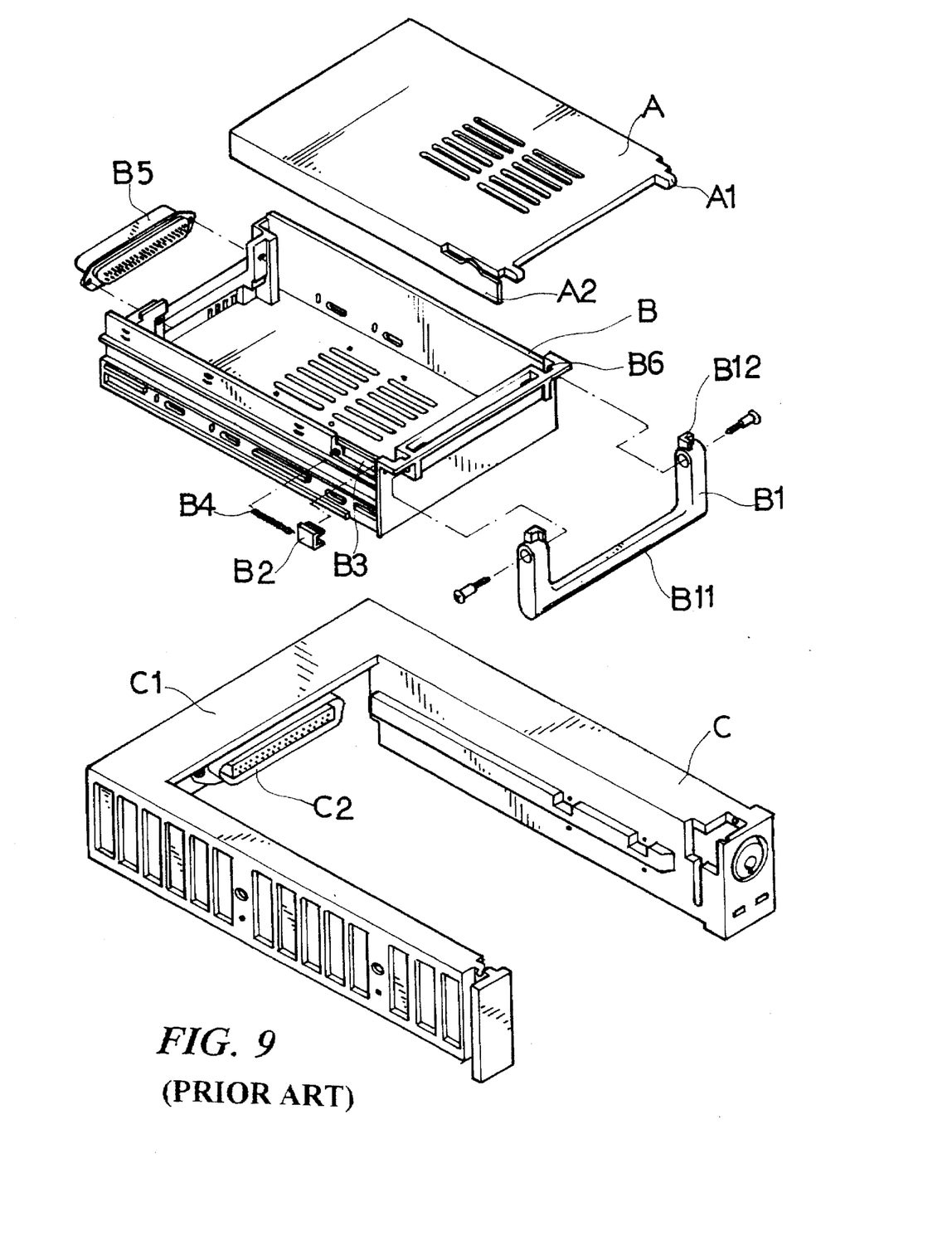
FIG. 9 is a perspective exploded view of a conventional hard disk converting drawer structure.
Figure 61:
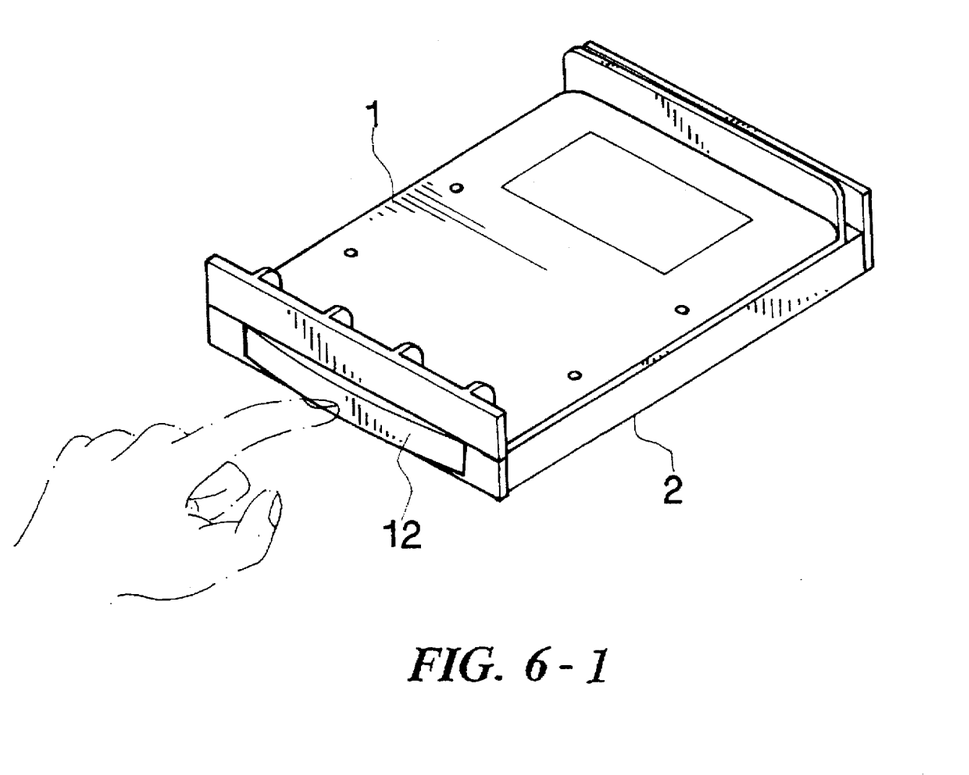
Figure 62:
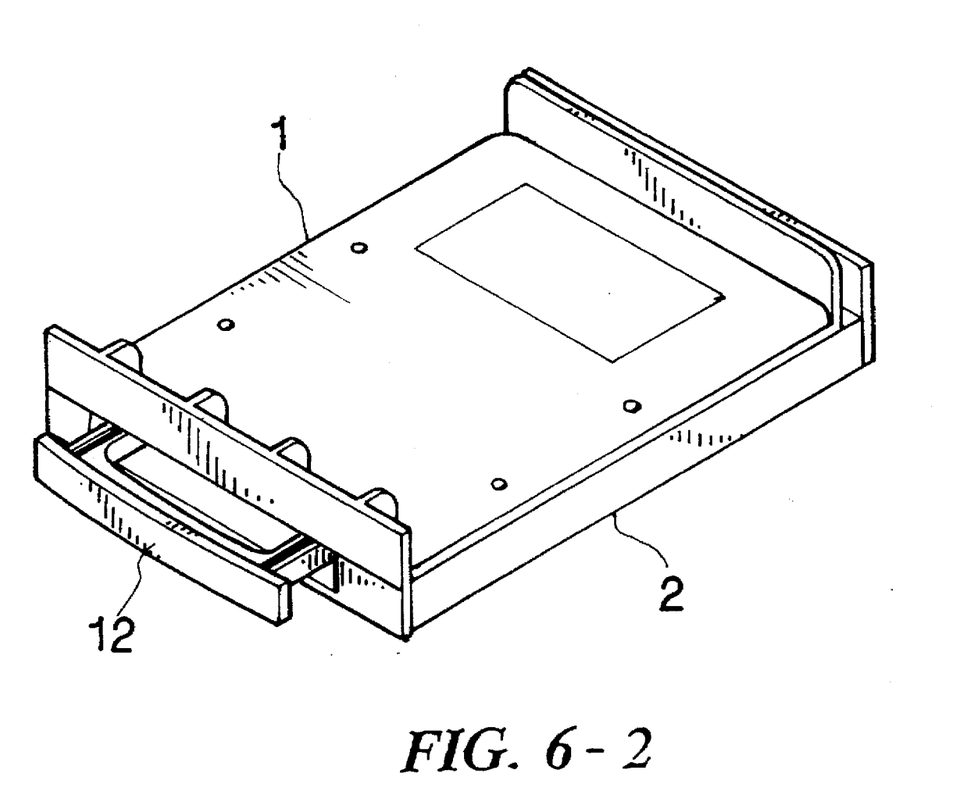
Figure 63:
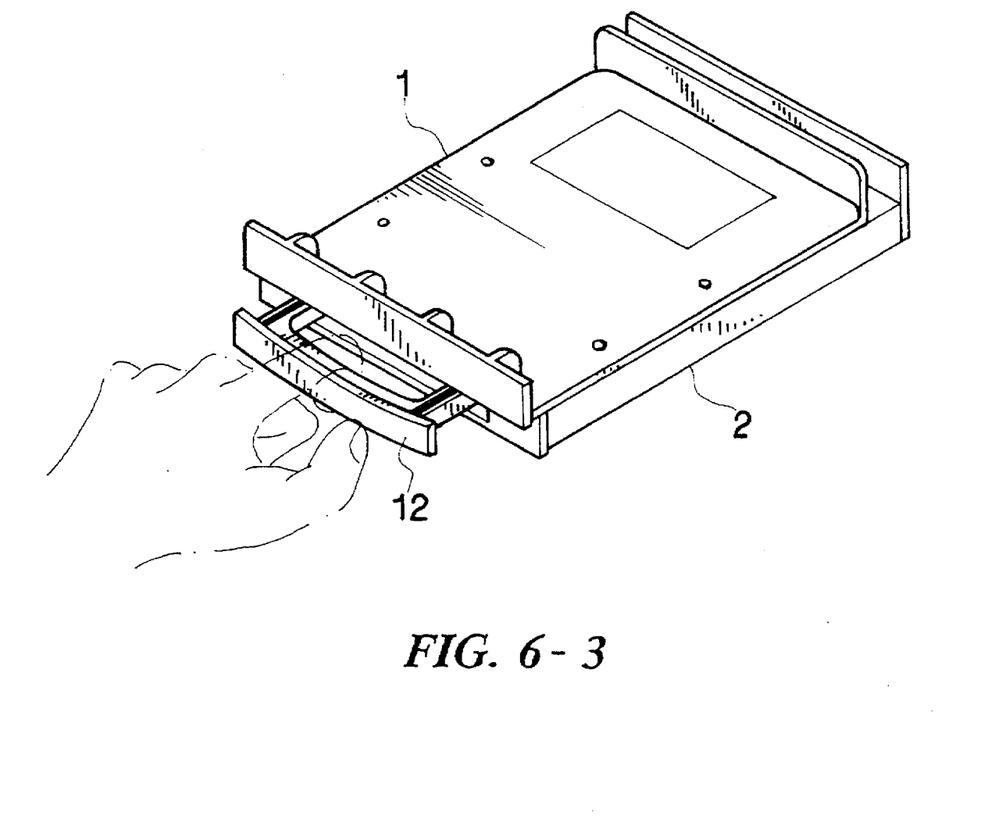
Figure 71:
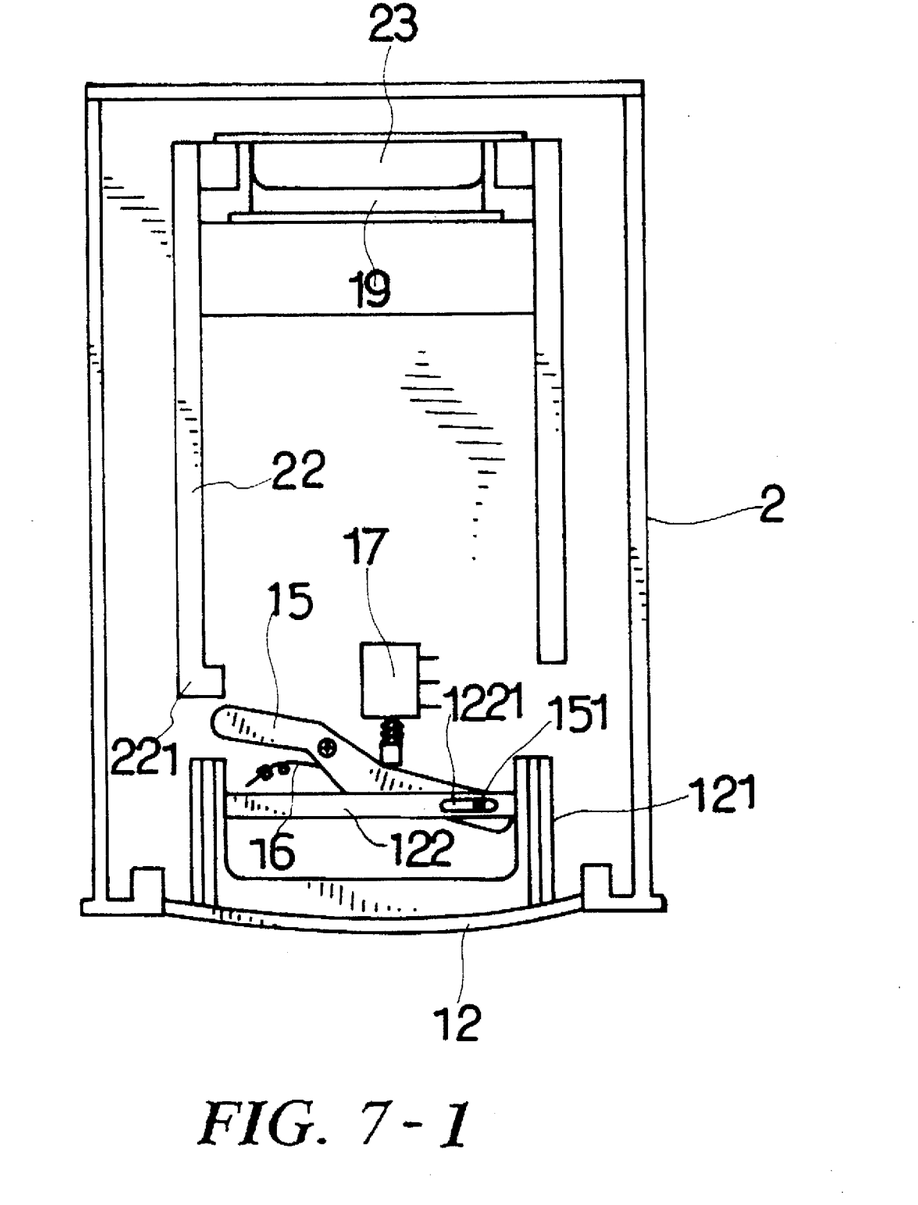
Figure 72:
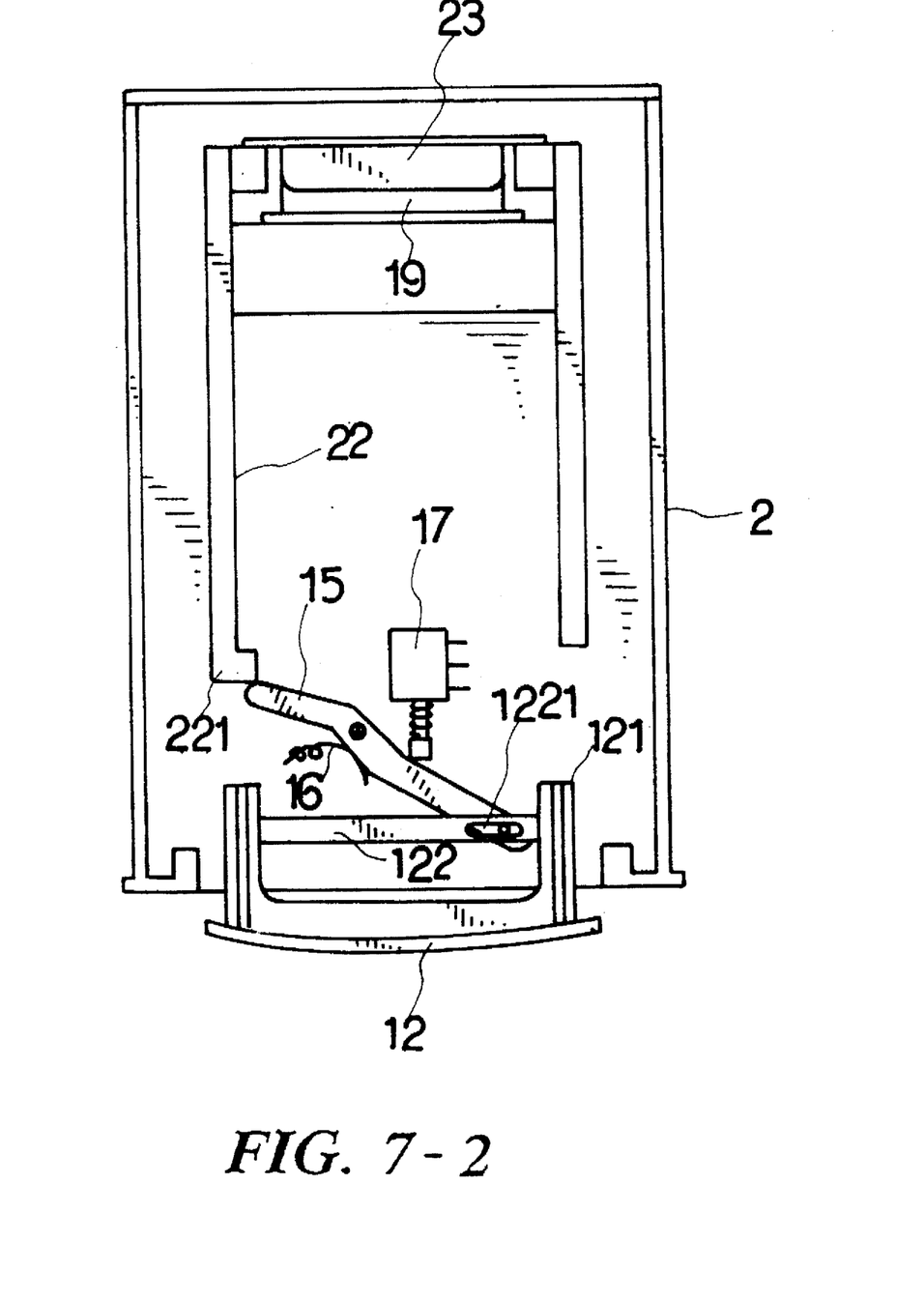
Figure 73:
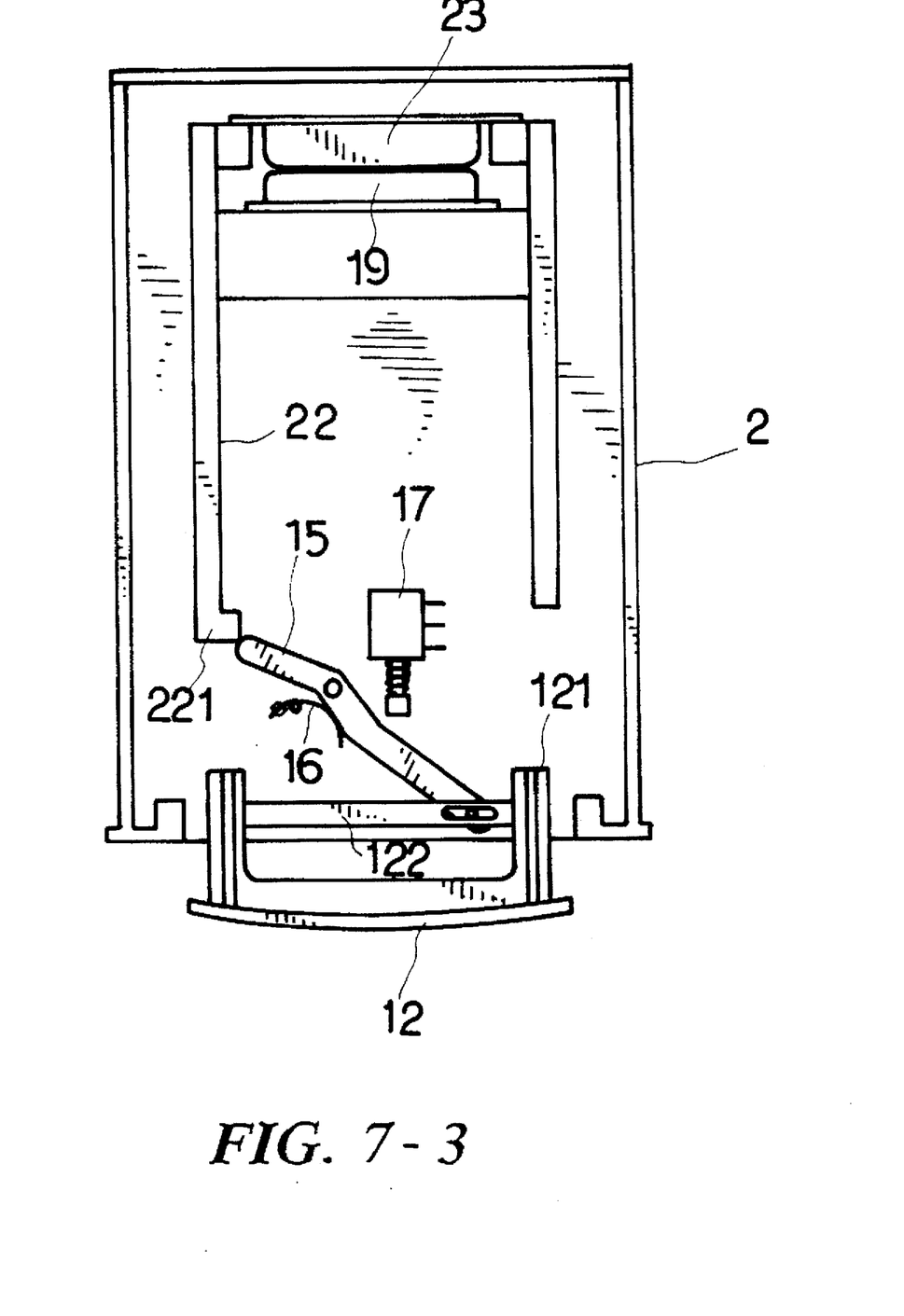

FIG. 9 shows a conventional hard disk converting drawer structure including an upper cover A, a drawer B and a fixing seat C. A pull handle B1 is suspended at the front end of the drawer B. A user can first slightly lift the handle B11 with his fingers and then pull the handle outward. This procedure is troublesome to the user. In addition, the pull handle B1 is exposed to the outer side of the computer main frame so that the appearance of the panel is affected. Moreover, when it is desired to pull out and detach the drawer B from the fixing seat C, two projecting blocks B12 disposed above two free ends of the pull handle B1 rearward push two projecting sections A1 formed at front end of the upper cover A. At this time, the resilient engaging hook A2 of the upper cover A drives the slide block B2 to rearward compress the small spring B4 within the slide rail B3, while the rear end of the upper cover A pushes the bottom end C1 of the fixing seat C so as to evenly smoothly pull apart the two connecting ports B5, C2. When the pull handle B1 is downward folded, the compressing force is released to make the small spring B4 push the slide block B2 to further drive the resilient engaging hook A2 for forward restoring the upper cover A to its home position. At this time, the two projecting sections A1 of the upper cover A are located in two recesses B6 formed at front end of the drawer B. According to the above arrangement, the pulling force is mainly exerted onto the lateral projecting blocks B12 so that the user must draw out the drawer B with a greater force.

SUMMARY OF THE INVENTION

It is therefore a primary object of the present invention to provide a hard disk converting drawer structure which is simply constructed and can be conveniently used. Moreover, a user can pull out the drawer with less force. In addition, the pull handle is hidden so that the appearance of the panel of the computer main frame is kept tidy.

The present invention can be best understood through the following description and accompanying drawing, wherein:

BRIEF DESCRIPTION OF THE DRAWINGS

FIG. 6-1 shows the operation of the present invention in a first state;

FIG. 6-2 shows the operation of the present invention in a second state;

FIG. 6-3 shows the operation of the present invention in a third state;

FIG. 7-1 shows the use of the present invention in a first state;

FIG. 7-2 shows the use of the present invention in a second state;

FIG. 7-3 shows the use of the present invention in a third state;

DETAILED DESCRIPTION OF THE PREFERRED EMBODIMENT

Figure 1:
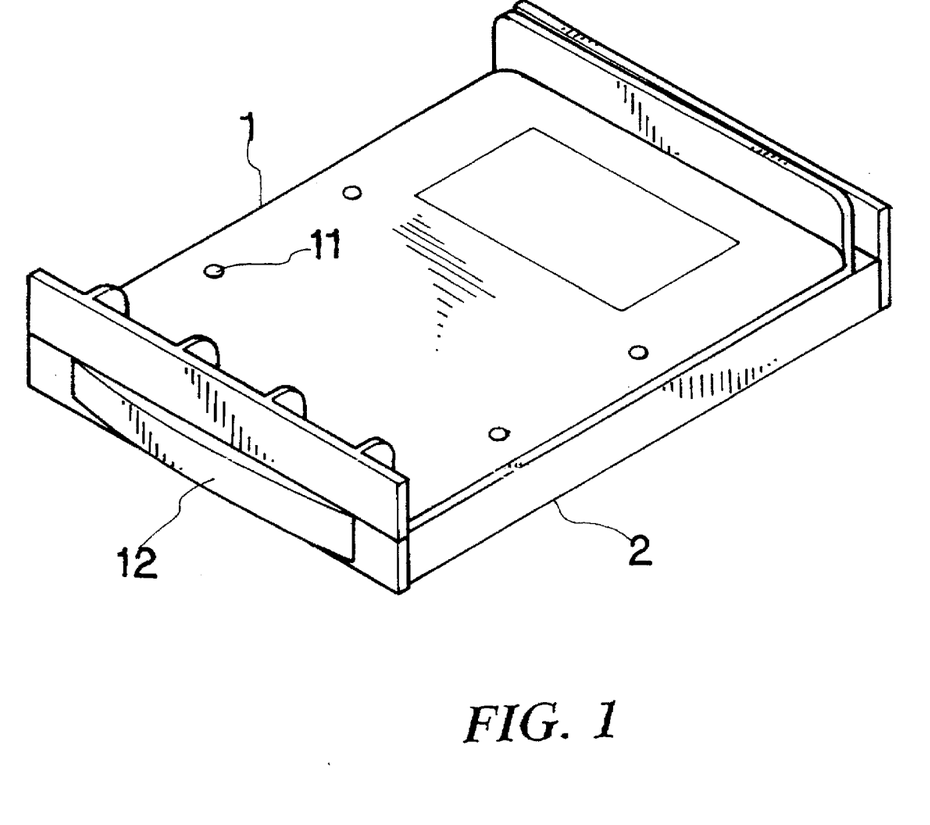
FIG. 1 is a perspective assembled view of the present invention.
Figure 2:
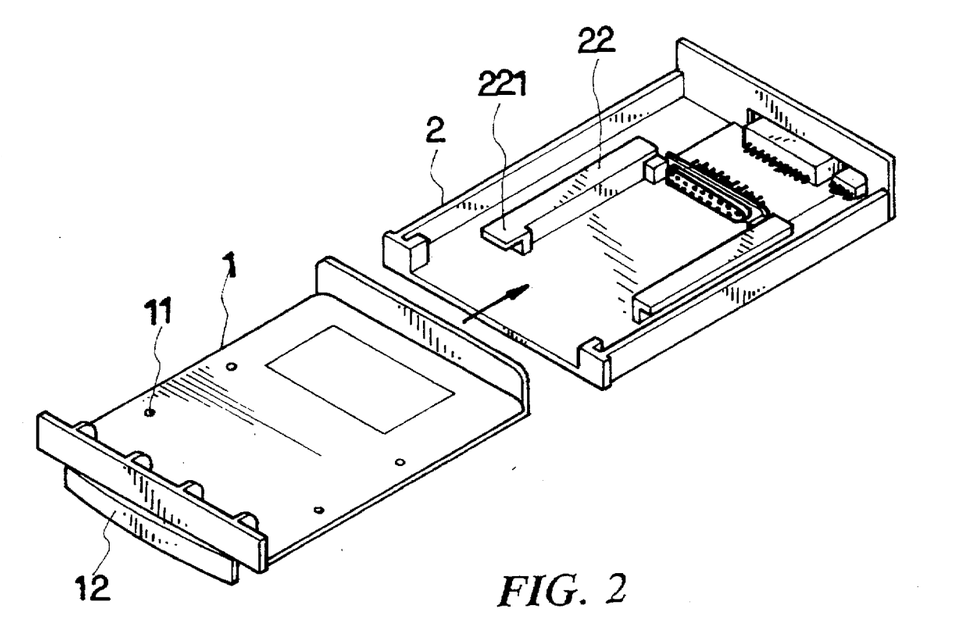
FIG. 2 is a perspective exploded view of the present invention.
Figure 3:
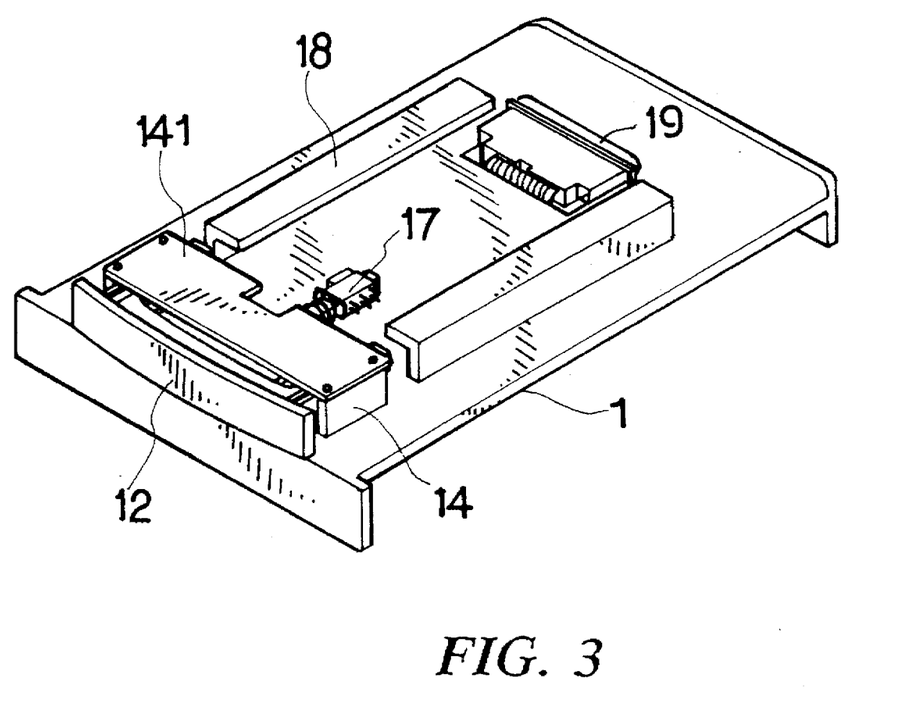
FIG. 3 is a perspective bottom view of the drawer of the present invention.
Figure 4:
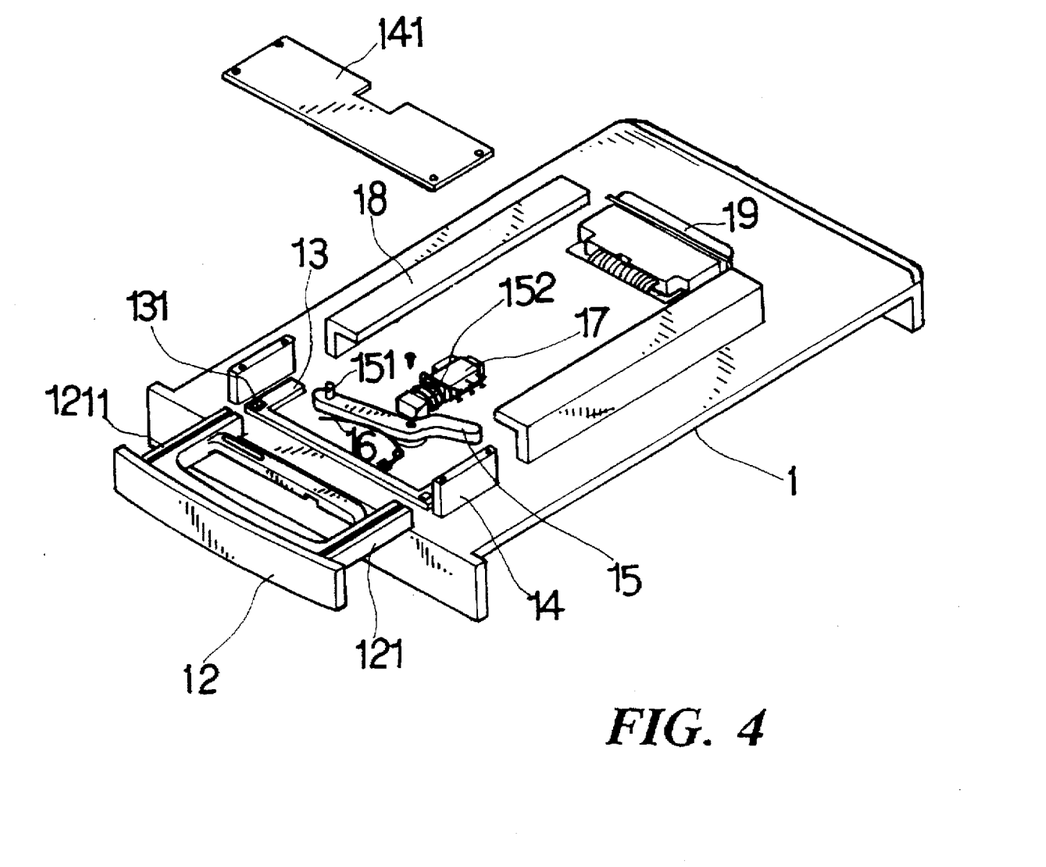
FIG. 4 is a perspective exploded view according to FIG. 3.
Figure 5:
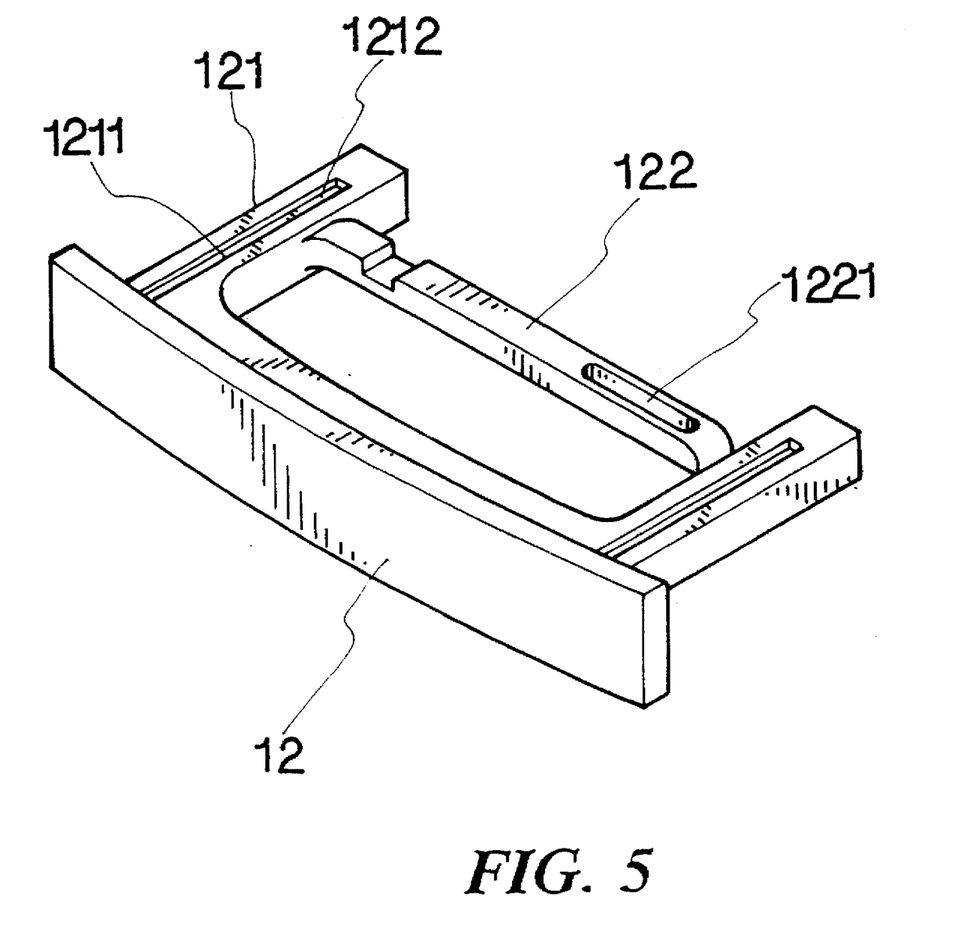
FIG. 5 is a perspective bottom view of the pull handle of the present invention.
Figure 8:
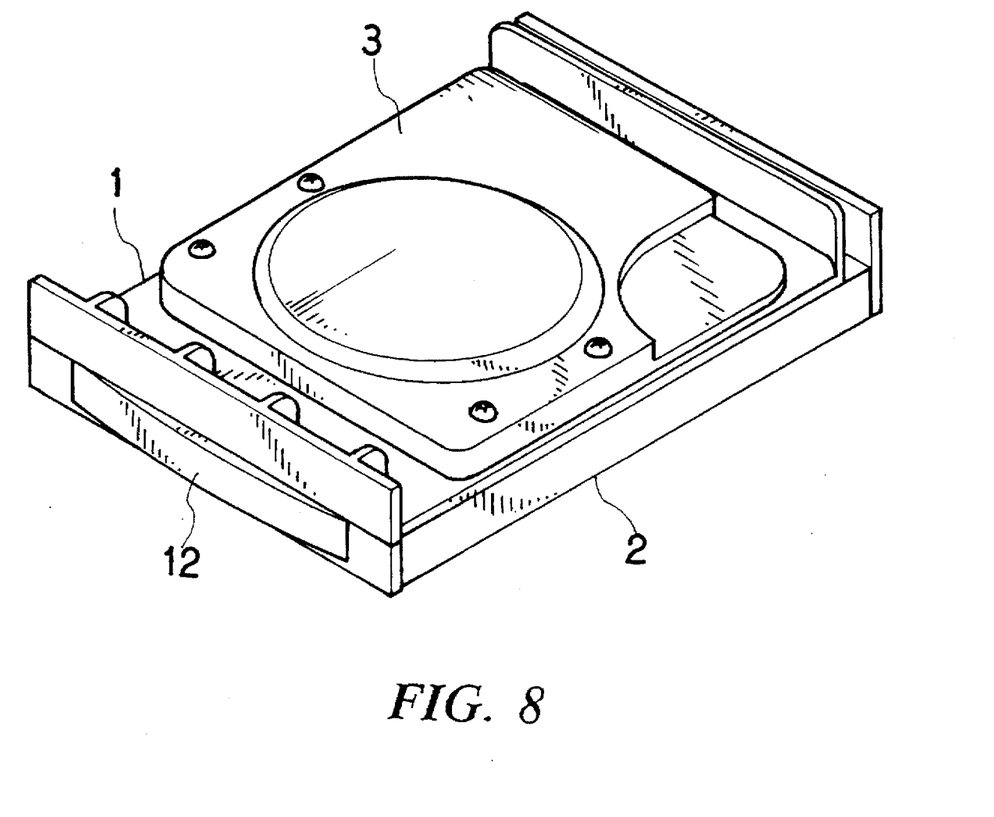
FIG. 8 shows the application of the present invention.

Please refer to FIGS. 3, 4, and 5. The present invention mainly includes a drawer 1 and a fixing seat 2.

The drawer 1 is a U-shaped body formed with thread holes 11 for locking a hard disk 3 therein. A pull handle 12 is disposed at the front end of bottom side of the drawer 1. Two lateral sides of the pull handle 12 are disposed with two balance levers 121 each of which is formed with an upper and a lower slide channels 1211. The lower slide channel 1211 is disposed with an engaging section 1212 which is back and forth movable along a locating block 131 disposed on each of two symmetrical plane boards 13 without detachment. Two vertical locating boards 14 are disposed on outer sides of the plane boards 13 for locking a cover board 141 thereon. The cover board 141 is disposed with two engaging blocks corresponding to the upper slide channels 1211 of the balance levers 121 so that the pull handle 12 can be stably slided without detachment. A transverse beam 122 is disposed between the two balance levers 121 of the pull handle 12. The transverse beam 122 is formed with a slot 1221 in which a boss 151 disposed at one end of an auxiliary lever 15 is fitted to pull back and forth. The auxiliary lever 15 is formed with a shaft hole 152 for left and right swingably securing the auxiliary lever 15 on the drawer 1. One side of the auxiliary lever is resiliently forced by a leaf spring 16, while the other side thereof is engaged with a touch switch 17. In addition, two opposite inward bent L-shaped guide rails 18 are disposed on two lateral sides of the drawer 1.

The fixing seat 2 is a box body for the drawer 1 to insert therein. The front side of the fixing seat 2 is formed with an opening for freely movably receiving the pull handle 12. Two opposite outward bent L-shaped guide rails 22 are disposed in the fixing seat 2, whereby the L-shaped guide rails 22 of the drawer 1 are inserted and retained therein. In addition, a stopper block 221 protrudes from a front edge of the outward bent L-shaped guide rail 22.

Referring to FIGS. 6-1, 6-2, 6-3, and 7-1, 7-2, and 7-3, when the drawer 1 is assembled with the fixing seat 2, the pull handle 12 is first slightly inward pressed to push and rotate the auxiliary lever 15 to forcedly compress and close the touch switch 17. At this time, the auxiliary lever 15 is resiliently pressed by the leaf spring 16 to abut against and engage with the front edge of the touch switch 17 and simultaneously inward move and fix the pull handle 12. Therefore, the pull handle 12 is hidden. When the pull handle 12 is again slightly pressed, the auxiliary leve 15 pushes the touch switch 17 to bound open. The bounding force is greater than the resilient force of the leaf spring 16 so that the auxiliary lever 15 moves rearward to forcedly eject the pull handle 12 out of the drawer 1 for easy pulling. When the user pulls the pull handle 12, one end of the auxiliary lever 17 just abuts against the stopper block 221 of the fixing seat 2. By means of leverage, the two connecting ports 19, 23 of the drawer 1 and the fixing seat 2 are smoothly detached from each other. Therefore, the user can pull out the drawer with less force.

The advantages of the present invention are as follows:

1. The drawer can be more conveniently and easily drawn out with less force.
2. The pull handle 12 is hidden in the drawer 1 to keep the appearance of the panel of the computer main frame tidy.
3. The touch switch 17 is connected to the wire for controlling the power of hard disk 3, whereby when the drawer 1 is pulled out, the hard disk 3 is powered off to achieve a protective effect. Also, it is no more necessary to install a hard disk lock.

It is to be understood that the above description and drawings are only used for illustrating one embodiment of the present invention, not intended to limit the scope thereof. Any variation and derivation from the above description and drawings should be included in the scope of the present invention.

What is claimed is:

1. A hard disk converting drawer structure comprising a drawer and a fixing seat, wherein:

a pull handle is disposed at the front end of bottom side of the drawer, two lateral sides of the pull handle being disposed with two balance levers each of which is formed with an upper and a lower slide channels, whereby the pull handle is back and forth movable along a locating block disposed on each of two symmetrical plane boards, two vertical locating boards being disposed on outer sides of the plane boards for locking a cover board thereon, the cover board being disposed with two engaging blocks, whereby the pull handle can be stably slided without detachment, a transverse beam being disposed between the two balance levers of the pull handle, the transverse beam being formed with a slot in which a boss disposed at one end of an auxiliary lever is fitted to pull back and forth, the auxiliary lever being formed with a shaft hole for left and right swingably securing the auxiliary lever on the drawer, one side of the auxiliary lever being resiliently forced by a leaf spring, while the other side thereof being engaged with a touch switch, two opposite inward bent L-shaped guide rails being disposed on two lateral sides of the drawer;

the fixing seat is a box body for the drawer to insert therein, the front side of the fixing seat being formed with an opening for freely movably receiving the pull handle, two opposite outward bent L-shaped guide rails being disposed in the fixing seat, whereby the L-shaped guide rails of the drawer are inserted and retained therein.

2. A drawer structure as claimed in claim 1, wherein the lower slide channel is disposed with an engaging section for engaging with the locating block for avoiding detachment of the pull handle during pulling.

3. A drawer structure as claimed in claim 1, wherein the cover board is disposed with two engaging blocks on lower side for fitting into the upper slide channels of the balance levers so that the pull handle can be more stably slided.

4. A drawer structure as claimed in claim 1, wherein a stopper block protrudes from a front edge of the outward bent L-shaped guide rail, whereby when pulling out the pull handle, the auxiliary lever is driven to push the stopper block so as to smoothly draw out the drawer from the fixing seat.

* * * * *